(12) United States Patent
Fukukita

(10) Patent No.: US 7,455,642 B2
(45) Date of Patent: Nov. 25, 2008

(54) ULTRASONIC DIAGNOSTIC APPARATUS

(75) Inventor: Hiroshi Fukukita, Setagaya-ku (JP)

(73) Assignee: Panasonic Corporation, Osaka (JP)

( * ) Notice: Subject to any disclaimer, the term of this patent is extended or adjusted under 35 U.S.C. 154(b) by 474 days.

(21) Appl. No.: 11/239,552

(22) Filed: Sep. 29, 2005

(65) Prior Publication Data

US 2006/0116580 A1    Jun. 1, 2006

(30) Foreign Application Priority Data

Oct. 8, 2004    (JP)    ............... 2004-296875

(51) Int. Cl.
*A61B 8/00*    (2006.01)
(52) U.S. Cl. ............... 600/447; 600/437; 600/459
(58) Field of Classification Search ............... 600/437, 600/459, 447; 73/625; 367/140
See application file for complete search history.

(56) References Cited

U.S. PATENT DOCUMENTS 6,013,032 A * 1/2000 Savord ............... 600/443
6,110,116 A * 8/2000 Wright et al. ............... 600/447

FOREIGN PATENT DOCUMENTS

JP    2000-33087    2/2000

* cited by examiner

*Primary Examiner*—Eric F Winakur
*Assistant Examiner*—Katherine L Fernandez
(74) *Attorney, Agent, or Firm*—Pearne & Gordon LLP

(57) ABSTRACT

Disclosed is an ultrasonic diagnostic apparatus that can dynamically change a focus position of a phasing circuit installed in a sub-array. A transducer element is two-dimensionally arrayed and constitutes a sub-array. The sub-array is two-dimensionally arrayed and constitutes an arrayed transducer element. An output of the transducer element of the sub-array is sent to a phasing circuit and a phasing circuit. Outputs of the phasing circuits are coupled by a coupling circuit. All of the foregoing transducer elements, sub-arrays, phasing circuits and coupling circuits are accommodated in a probe handle. An output from the coupling circuit is sent through a probe cable to a delay adding circuit of a main body. Also, the phasing circuits are controlled by a control circuit. An output of the delay adding circuit is processed by a signal processor and displayed on a display.

4 Claims, 4 Drawing Sheets

ULTRASONIC DIAGNOSTIC APPARATUS

BACKGROUND OF THE INVENTION

1. Field of the Invention

The present invention relates to an ultrasonic diagnostic apparatus that has a two-dimensional array and three-dimensionally scans a subject.

2. Description of the Related Art

As shown in FIG. 4, a conventional ultrasonic diagnostic apparatus is provided with: a transmitting array $30_A$ including many transducer elements assigned to several transmitting sub-arrays $31_1$, $31_2$ to $31_M$; a transmitting beam former 40 including several transmitting beam former channels $41_1$, $41_2$ to $41_M$; in-group transmitting processors $38_1$, $38_2$ to $38_M$ which are configured and arrayed so as to generate an acoustic beam emitted to a subject portion; a receiving array $30_B$ that includes many transducer elements assigned to several receiving sub-arrays $42_1$, $42_2$ to $42_N$; several in-group receiving processors $44_1$, $44_2$ to $44_N$ connected to the several receiving sub-arrays $42_{1-N}$; a receiving beam former 46 that includes charge coupling elements for forming delaying elements which are arrayed so as to receive a transducer signal in response to an echo from the acoustic beam, from the transducer element of the sub-array where each of the in-group receiving processors $44_{1-N}$ is connected, and are arrayed so as to delay the transducer signal received by each of the in-group receiving processors $44_{1-N}$, and includes an adding element for receiving the delayed transducer signal and adding the delayed transducer signal; several processing channels $48_1$, $48_2$ to $48_N$ where this receiving beam former 46 is connected to the several in-group receiving processors $44_{1-N}$; and an image generator 58 that includes a beam former delaying mechanism where each of the processing channels $48_{1-N}$ synthesizes the receiving beams from the echo in accordance with the receiving signals received from the in-group receiving processor $44_{1-N}$ and a beam former adding mechanism 50 for receiving the signals from the processing channels $48_{1-N}$ and adding them, and generates the image of the subject portion in accordance with the signal received from the receiving beam former 46 (for example, refer to the following patent document 1).

[Patent Document 1] Japanese Patent Application Publication (2000-33087)

However, in the conventional ultrasonic diagnostic apparatus, if a dynamic focus for dynamically changing a focus distance of reception is tried, a clock frequency of the charge coupling element of the in-group receiving processor must be changed, which results in a problem of noise generation. Also, there is a problem that the numbers of the in-group receiving processors $44_{1-N}$, the processing channels $48_{1-N}$ and the signal lines to connect them must be increased in order to exhibit the directivity of the reception in a plurality of directions at the same time.

SUMMARY OF THE INVENTION

The present invention is proposed in order to solve the above-mentioned conventional problems. It is therefore an object of the present invention to provide an ultrasonic diagnostic apparatus, which can attain a dynamic focus in which noise is small, or can exhibit a directivity of reception in a plurality of directions without any increase in the number of signal lines.

An ultrasonic diagnostic apparatus of the present invention has the configuration where it has a probe handle and a main body, and at least two-dimensionally arrayed transducer elements are divided into a plurality of sub-arrays, and for each sub-array, a plurality of phasing circuits are installed inside the probe handle, respectively, and receiving signal outputs of the plurality of phasing circuits are coupled inside the probe handle for each sub-array, and the coupled receiving signal output of the phasing circuit is generated for each sub-array and delayed and added in the main body.

This configuration can attain the dynamic focus whose noise is small, or can exhibit the directivity of the reception in the plurality of directions without any increase in the number of the signal lines.

Also, in the ultrasonic diagnostic apparatus of the present invention, the receiving signal outputs of the plurality of phasing circuits of the sub-array are mutually coupled by a switch, and among the plurality of phasing circuits, the receiving signal output of the phasing circuit which carries out a phasing operation is selected by the switch, and in the phasing circuit which does not carry out the phasing operation, a phasing data is re-written.

This configuration can attain the dynamic focus whose noise is small.

Moreover, the ultrasonic diagnostic apparatus of the present invention is configured such that an analog delaying circuit for delaying the output signal of each transducer element inside the sub-array is installed, and in the phasing circuit which does not carry out the phasing operation, the operation of the analog delaying circuit is stopped.

The configuration can directly couple the outputs from the plurality of phasing circuits and can reduce the electric power consumption in the phasing circuit.

Moreover, the ultrasonic diagnostic apparatus of the present invention is configured such that the receiving signal outputs of the plurality of phasing circuits of the sub-array are modulated and then coupled and further demodulated in the main body and then delayed and added.

This configuration can exhibit the directivity of the reception in the plurality of directions without any increase in the number of the signal lines.

The present invention can provide the ultrasonic diagnostic apparatus, where at least two-dimensionally arrayed transducer elements are divided into the plurality of sub-arrays, and for each sub-array, the plurality of phasing circuits are installed inside the probe handle, respectively, and the receiving signal outputs of the plurality of phasing circuits are coupled inside the probe handle for each sub-array, and the coupled receiving signal output of the phasing circuit is delayed and added, and this can accordingly have the effect that the dynamic focus with the small noise is possible and that the directivity of the reception is exhibited in the plurality of directions without any increase in the number of the signal lines.

DESCRIPTION OF THE PREFERRED EMBODIMENTS

An ultrasonic diagnostic apparatus of the embodiment of the present invention will be described below with reference to the drawings.

First Embodiment

Figure 1:
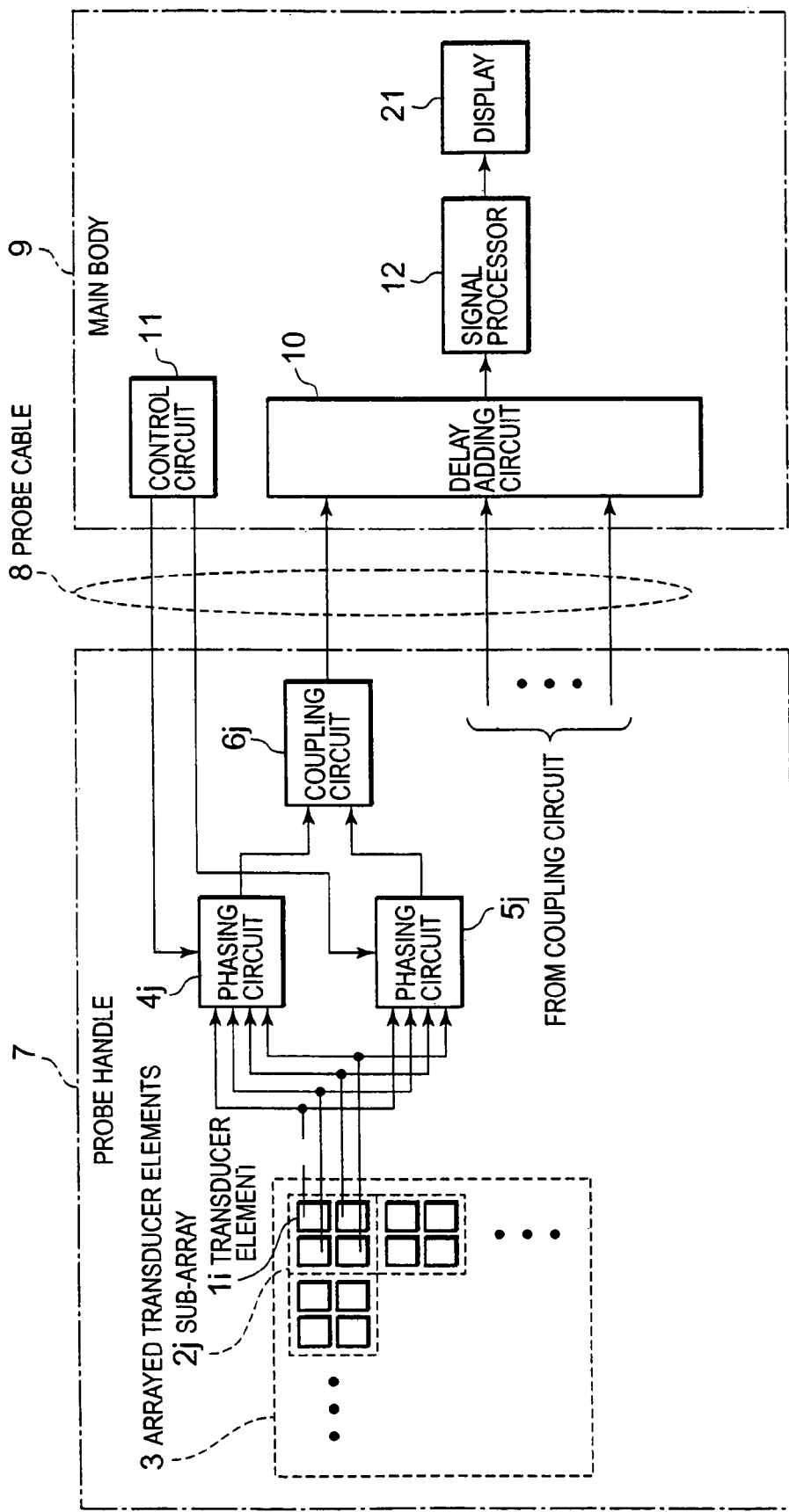
FIG. 1 is a main portion block diagram showing a receiver of an ultrasonic diagnostic apparatus in a first embodiment of the present invention.

FIG. 1 shows a main portion block diagram of a receiver of an ultrasonic diagnostic apparatus in the first embodiment of the present invention. In FIG. 1, a transducer element $1_i$ is two-dimensionally arrayed and constitutes a sub-array $2_j$. The sub-array $2_j$ is two-dimensionally arrayed and constitutes an arrayed transducer elements 3. An output of the transducer element $1_i$ of the sub-array $2_j$ is sent to a phasing circuit $4_j$ and a phasing circuit $5_j$ both functioning as phase-adjusting circuits. Outputs of the phasing circuits $4_j$, $5_j$ are coupled by a coupling circuit $6_j$. In FIG. 1, for convenience, symbols are given to only the i-th and j-th units, among all of the transducer elements, sub-arrays, phasing circuits and coupling circuits. All of the foregoing transducer elements, sub-arrays, phasing circuits and coupling circuits are accommodated inside a probe handle 7. An output from the coupling circuit $6_j$ is sent through a probe cable 8 to a delay adding circuit 10 of a main body 9. Also, the phasing circuits $4_j$, $5_j$ are controlled by a control circuit 11. An output of the delay adding circuit 10 is processed by a signal processor 12, and an image screen is displayed on a display 21.

Figure 2:
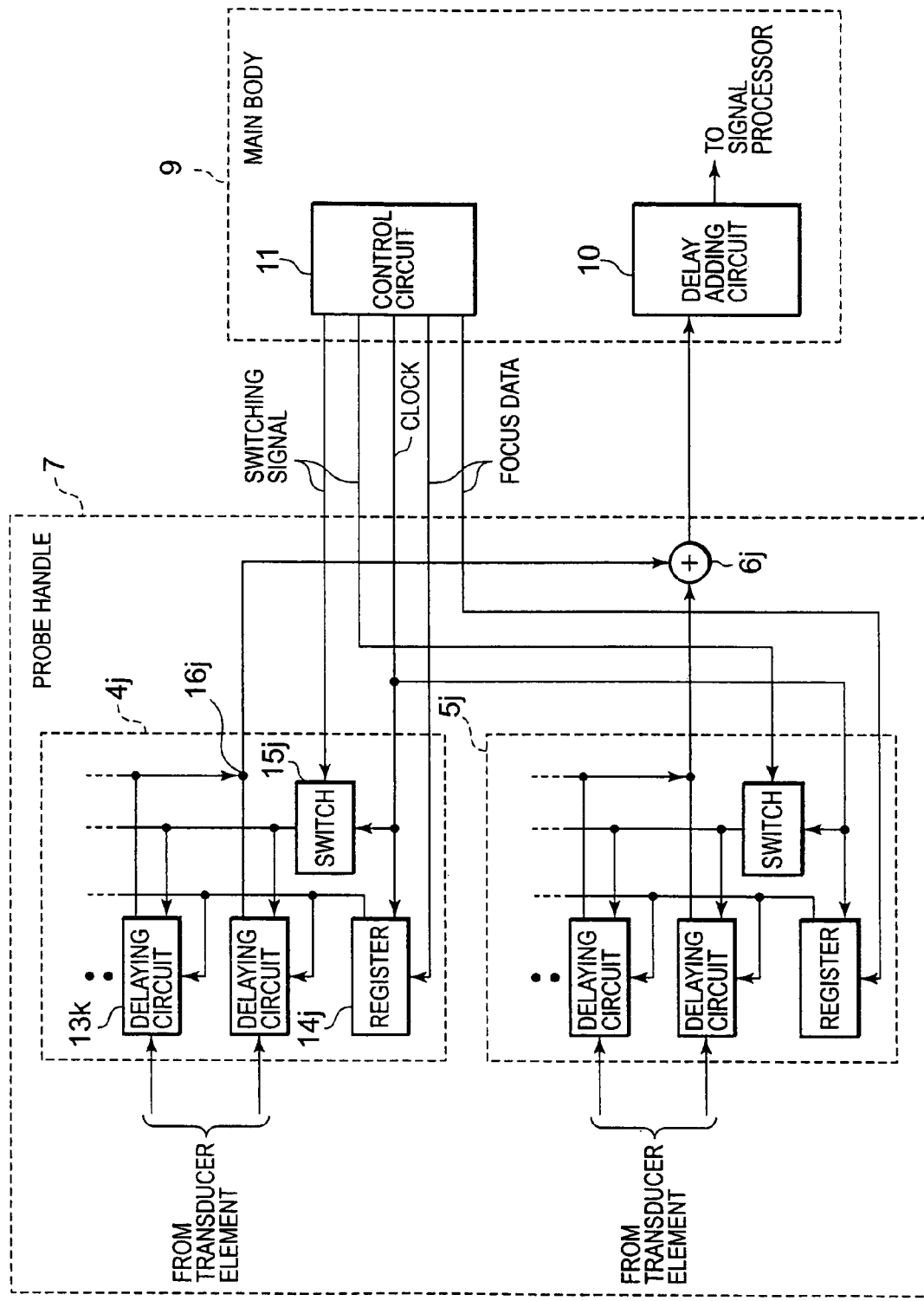
FIG. 2 is a detailed block diagram showing a phasing circuit and its periphery in the first embodiment of the present invention.

FIG. 2 is a detailed block diagram showing the phasing circuits $4_j$, $5_j$ and their peripheries. At first, a signal of a transducer element of one sub-array is sent to a delaying circuit $13_k$. In FIG. 2, for convenience, among all of the delaying circuits $13_x$ (X is a character to specify an individual delaying circuit, and hereafter, all of the delaying circuits are indicated by the symbols 13), a symbol is given to only the k-th circuit. A focus data of the delaying circuits $13_x$ is sent by a register $14_j$. Although the delaying circuits $13_x$ is operated in accordance with a clock sent from the control circuit 11, its clock is controlled so as to be turned on and off by a switch $15_j$. The clock, the switching signal of the switch $15_j$, and the focus data of the register $14_j$ are sent from the control circuit 11. The output of the delaying circuits $13_x$ is added at an addition point $16_j$. The outputs of the phasing circuits $4_j$, $5_j$ are added by the coupling circuit $6_j$.

The operation of the ultrasonic diagnostic apparatus having the foregoing configuration will be described below with reference to FIG. 2. At first, the arrayed transducer elements 3 shown in FIG. 2 send an ultrasonic wave to a particular direction. Then, in such a way that the directivity of reception is generated in the sent direction, the focus data is stored in the register 14 prior to the receiving start, and the focus data is sent to each delaying circuits $13_x$. Next, among the switches 15 of the phasing circuits $4_j$, $5_j$, the switch $15_j$ of the phasing circuit $4_j$ is turned on, and the delaying circuits $13_x$ starts its operation. The switch of the phasing circuit $5_j$ is turned off, and the operation of the delaying circuits $13_x$ is stopped. In the phasing circuit $4_j$, in such a way that a receiving signal is phased at the shortest distance L, the focus data is stored in the register $14_j$. Next, the switch $15_j$ of the phasing circuit $4_j$ is turned off, and the operation of the delaying circuits $13_x$ is stopped. The switch of the phasing circuit $5_j$ is turned on, and the delaying circuits $13_x$ of the phasing circuit $5_j$ starts its operation. In the phasing circuit $5_j$, in such a way that a receiving signal is phased at a distance L+ΔL, the focus data is stored in the register. In a period where the switch of the phasing circuit $5_j$ is on, the focus data is stored in the register $14_j$ of the phasing circuit $4_j$ so that the receiving signal is phased at a distance L+2ΔL. The phasing of the receiving signal and the storing into the register of the focus data are executed alternately as mentioned above. The phasing circuit can phase the receiving signal from the near distance to the remote distance. Since the clock frequency of the delaying circuits $13_x$ operated as mentioned above and the focus data are not changed, the noise is never generated in the receiving signal. The outputs of the phasing circuits $4_j$, $5_j$ as mentioned above are added by the coupling circuit $6_j$, and delayed and added to the receiving signal from the other sub-array by the delay adding circuit 10. According to the ultrasonic diagnostic apparatus of the first embodiment of the present invention as mentioned above, the receiving signal from one sub-array is sent to the plurality of phasing circuits $4_j$, $5_j$, and the phasing operation is performed in one of the phasing circuits $4_j$, $5_j$, and the focus data is stored in the other circuit, and the outputs of the phasing circuits $4_j$, $5_j$ are coupled. Consequently, the phasing circuit can phase the receiving signal from the near distance to the remote distance by dynamically changing the focus position. By the way, in the foregoing explanation, the coupling circuit carries out the addition. However, it may be a switch for selecting the output of the phasing circuit that is operated.

Second Embodiment

Figure 3:
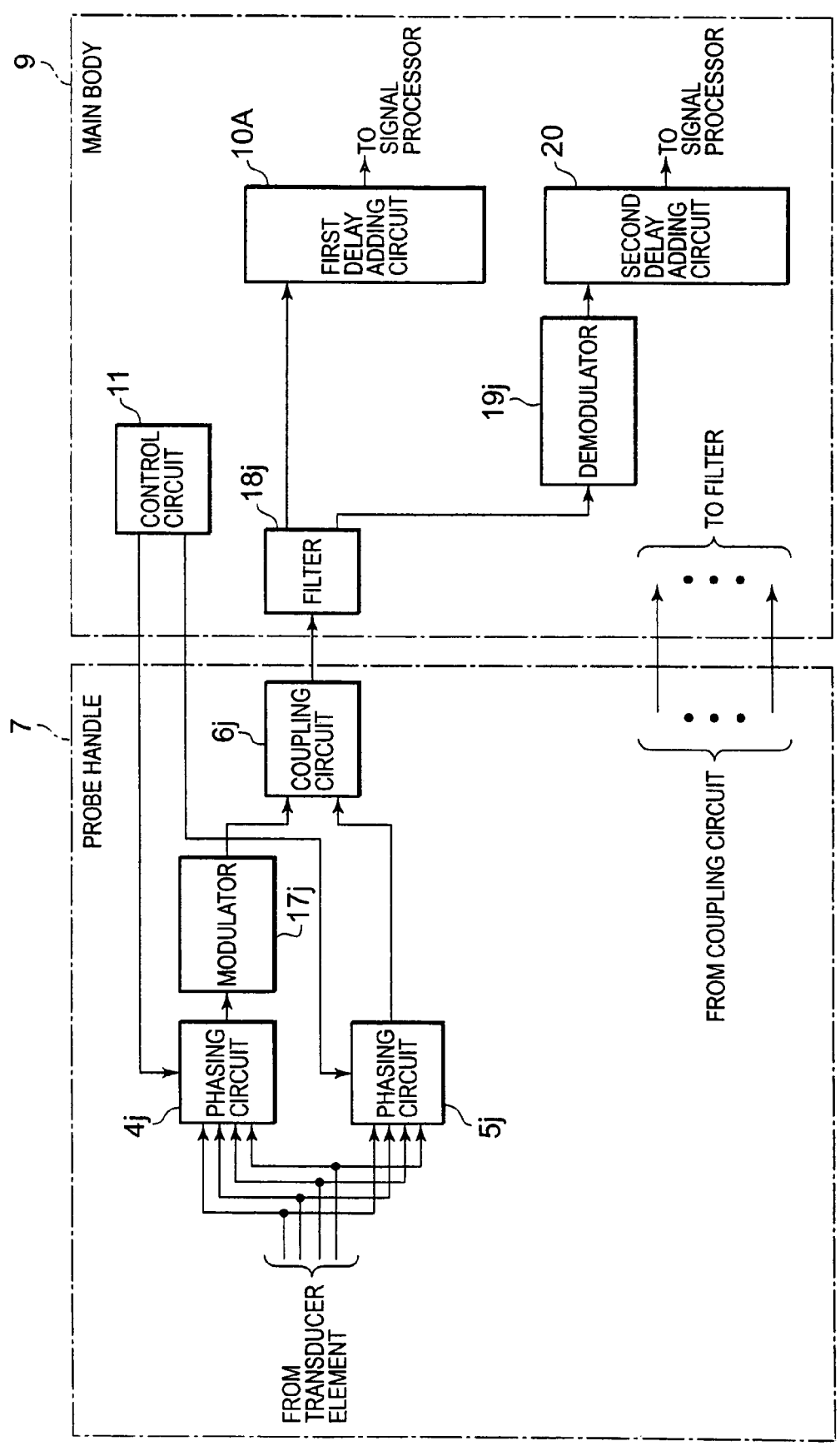
FIG. 3 is a main portion block diagram showing a receiver of an ultrasonic diagnostic apparatus in a second embodiment of the present invention.
Figure 4:
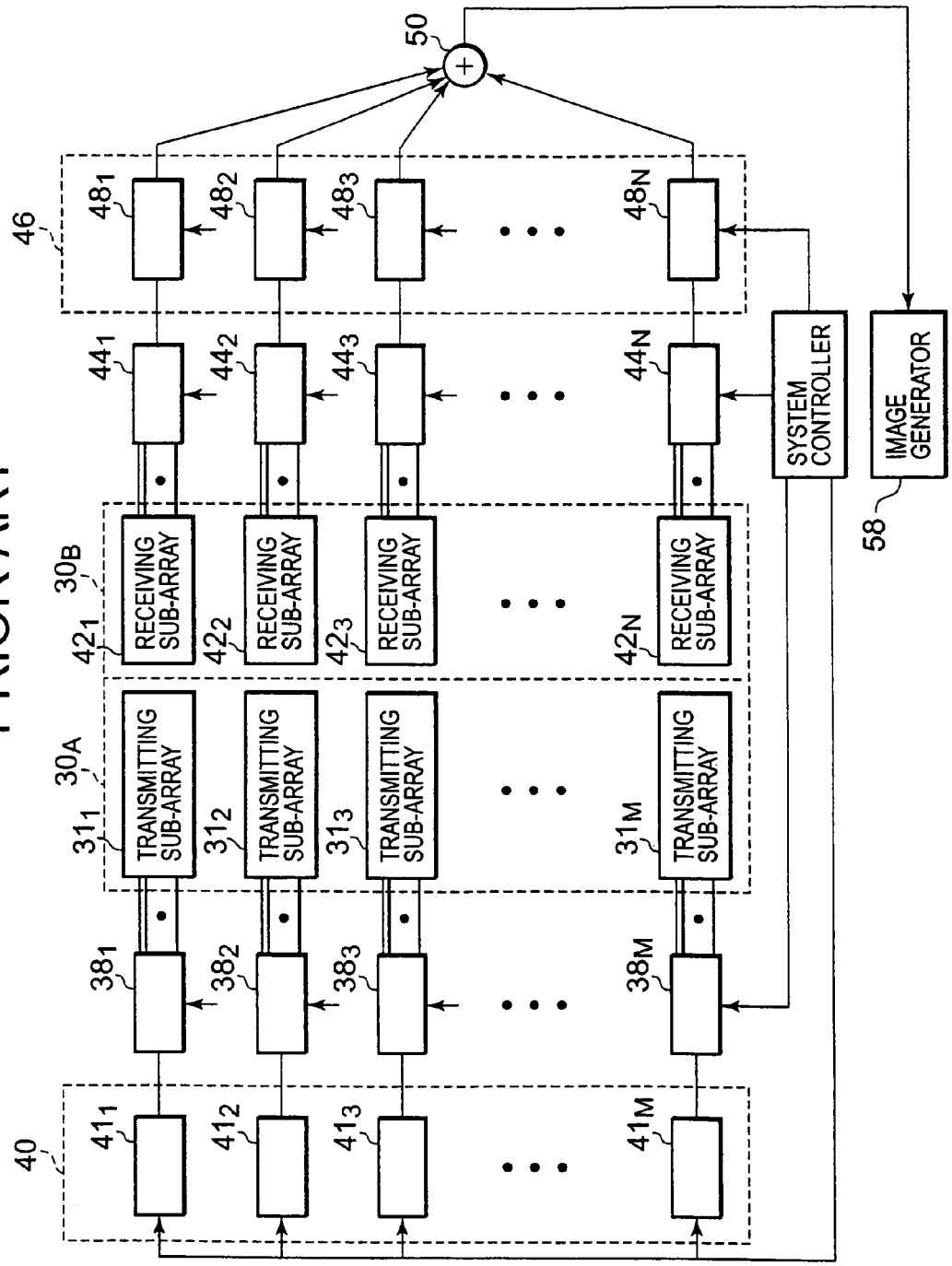
FIG. 4 is a block diagram showing a conventional ultrasonic diagnostic apparatus.

Next, FIG. 3 shows a main portion block of a receiver of an ultrasonic diagnostic apparatus of the second embodiment of the present invention. By the way, the same symbols or signs are given to the portions having the same configurations and functions as FIGS. 1, 2 referred by the first embodiment, and their explanations are omitted.

In FIG. 3, a modulator $17_j$ modulates the output of the phasing circuit $4_j$. A filter $18_j$ is connected to the output of the coupling circuit $6_j$. One output of the filter $18_j$ is sent to a first delay adding circuit 10A, and the other output of the filter $18_j$ is sent through a demodulator $19_j$ to a second delay adding circuit 20.

The operation of the ultrasonic diagnostic apparatus having the above-mentioned configuration will be described below with reference to FIG. 3. At first, the control circuit 11 sends the focus data where the receiving directivities are different, to the phasing circuits $4_h$, $5_j$. The output of the phasing circuit $4_j$ has a central frequency f0. A signal of a frequency f1 is mixed with the output of the phasing circuit $4_j$ by the modulator $17_j$, and the component of a frequency f0+f1 is outputted. In the coupling circuit $6_j$, the output of the phasing circuit $5_j$ is added to the output of the modulator $17_j$. However, the frequency f0 of the output of the phasing circuit $5_j$ and the frequency f0+f1 of the output of the modulator $17_j$ are sufficiently separate, which has no influence on the mutual signals. The filter $18_j$ separates the output of the coupling circuit $6_j$ into the component of the frequency f0 corresponding to the output of the phasing circuit $5_j$ and the component of the frequency f0+f1 corresponding to the output of the modulator $17_j$. The component of the frequency f0 is sent to the first delay adding circuit 10A. The component of the frequency f0+f1 is mixed with the frequency f0 by the demodulator $19_j$, and the component of the frequency f0 corresponding to the output of the phasing circuit $4_j$ is outputted. The output of the demodulator $19_j$ is sent to the second delay adding circuit 20. Consequently, the outputs of the plurality of phasing circuits $4_j$, $5_j$ having the directivities where the receiving directions are different can be coupled and sent to one signal line.

As mentioned above, according to the ultrasonic diagnostic apparatus of the second embodiment of the present invention, the plurality of phasing circuits and modulators are installed inside the probe handle. Thus, the plurality of receiving signals corresponding to the plurality of receiving directivities can be sent through one signal line to the main body. Hence, it is possible to reduce the number of the signal lines to connect the probe handle and the main body.

As mentioned above, the ultrasonic diagnostic apparatus according to the present invention has the effect that the phasing circuit can phase the receiving signal from the near distance to the remote distance by dynamically changing the focus position, and this is useful as the ultrasonic diagnostic apparatus which has the two-dimensional array and three-dimensionally scans the subject.

What is claimed is:

1. An ultrasonic diagnostic apparatus, comprising:
   a main body;
   a delay adding circuit within the main body;
   a probe handle;
   two-dimensionally arrayed transducer elements located within the probe handle, wherein the transducer elements are divided into a plurality of sub-arrays;
   a plurality of phasing circuits for each one of the sub-arrays that alternately carry out a phasing operation on output signals from said one of the sub-arrays, wherein each one of the phasing circuits has phasing data that is rewritten when the phasing circuit is not carrying out the phasing operation and not rewritten when the phasing circuit is carrying out the phasing operation,
   wherein each one of said phasing circuits outputs a receiving signal,
   wherein, for each one of the sub-arrays, the receiving signals outputted by its plurality of phasing circuits are coupled inside of said probe handle, and
   wherein coupled receiving signals are delayed and added by the delay adding circuit within the main body.

2. The ultrasonic diagnostic apparatus according to claim 1, further comprising a switch,
   wherein, for each one of the sub-arrays, the receiving signals outputted by its plurality of phasing circuits are mutually coupled by the switch, and
   among said plurality of phasing circuits, the receiving signal outputted from the phasing circuit which carries out a phasing operation is selected by said switch.

3. The ultrasonic diagnostic apparatus according to claim 1, further comprising analog delaying circuits within each one of the phasing circuits for delaying the output signals from said one of the sub-arrays, and
   in the phasing circuit which does not carry out the phasing operation, the operation of said analog delaying circuit is stopped.

4. The ultrasonic diagnostic apparatus according to claim 1, wherein, for each one of the sub-arrays, a portion of the receiving signals outputted by its plurality of phasing circuits are modulated by a modulator and then coupled and demodulated in said main body and then delayed and added.

* * * * *

UNITED STATES PATENT AND TRADEMARK OFFICE
CERTIFICATE OF CORRECTION

| | |
|---|---|
| PATENT NO. | : 7,455,642 B2 |
| APPLICATION NO. | : 11/239552 |
| DATED | : November 25, 2008 |
| INVENTOR(S) | : Hiroshi Fukukita |

It is certified that error appears in the above-identified patent and that said Letters Patent is hereby corrected as shown below:

In column 4, line 45, please delete "$4_h$" and insert therefor -- $4_j$ --.

Signed and Sealed this

Third Day of March, 2009

JOHN DOLL
*Acting Director of the United States Patent and Trademark Office*